No. 614,345. Patented Nov. 15, 1898.
E. B. REECE.
LAND ROLLER.
(Application filed Jan. 7, 1898.)
(No Model.) 2 Sheets—Sheet 1.

WITNESSES:
Frank A. Fahler
Emma Kaminsky

INVENTOR
Eli B. Reece
BY
Arthur M. Hood
ATTORNEY.

No. 614,345. Patented Nov. 15, 1898.
E. B. REECE.
LAND ROLLER.
(Application filed Jan. 7, 1898.)
(No Model.) 2 Sheets—Sheet 2.

WITNESSES
Frank A. Gable
Emma Kaminsky

INVENTOR
Eli B. Reece.
BY
Arthur M. Hood
ATTORNEY.

UNITED STATES PATENT OFFICE.

ELI B. REECE, OF WESTLAND, INDIANA, ASSIGNOR OF TWO-THIRDS TO MARK A. CATT AND ELMER J. BINFORD, OF GREENFIELD, INDIANA.

LAND-ROLLER.

SPECIFICATION forming part of Letters Patent No. 614,345, dated November 15, 1898.

Application filed January 7, 1898. Serial No. 665,910. (No model.)

*To all whom it may concern:*

Be it known that I, ELI B. REECE, a citizen of the United States, residing at Westland, in the county of Hancock and State of Indiana, have invented a new and useful Land-Roller, of which the following is a specification.

My invention relates to an improvement in land-rollers.

The objects of my invention are to provide means by which a three-roller machine may be easily turned within a short space, to provide improved means for hitching the horses to the machine, to provide an improved brake, and to provide the various other improvements hereinafter described.

The accompanying drawings illustrate my invention.

Figure 1:
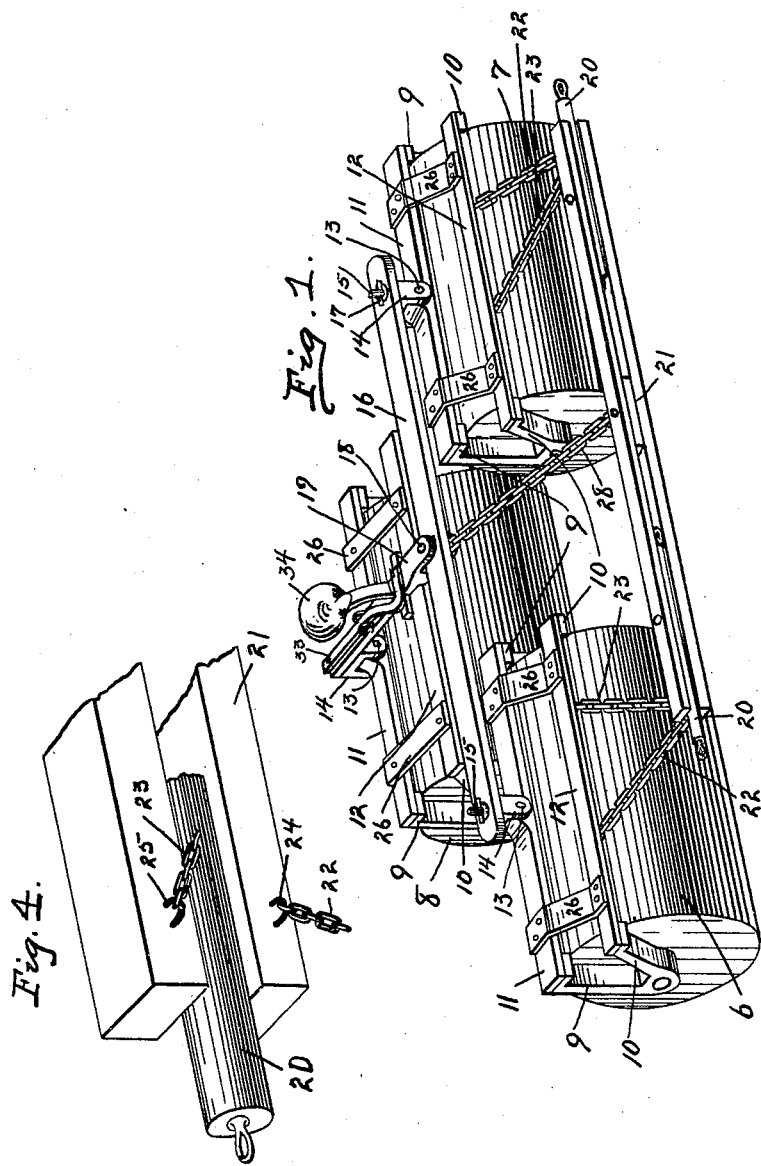
Figure 2:
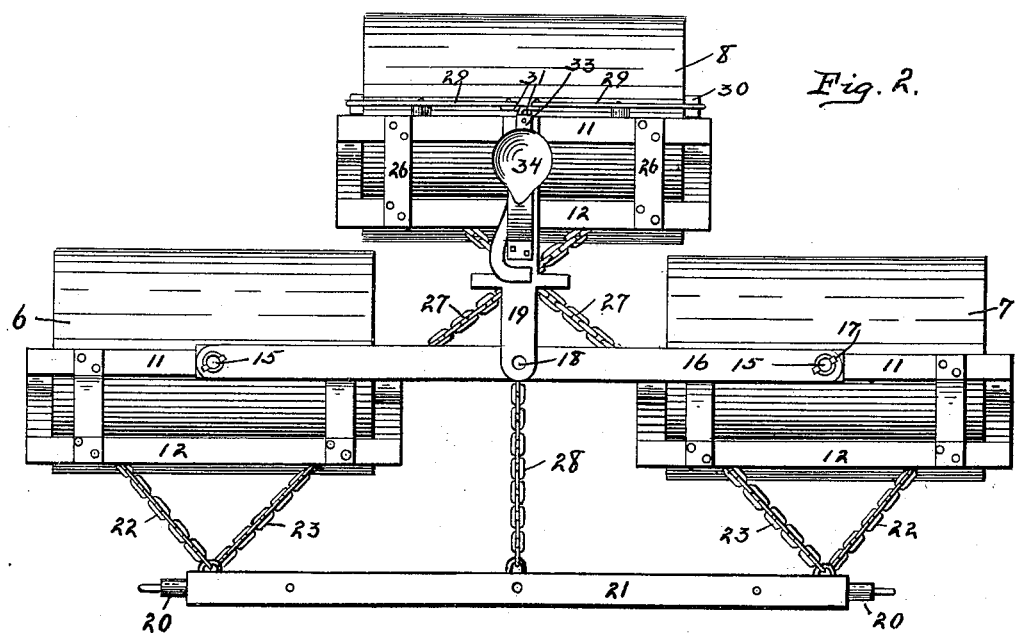
Figure 3:
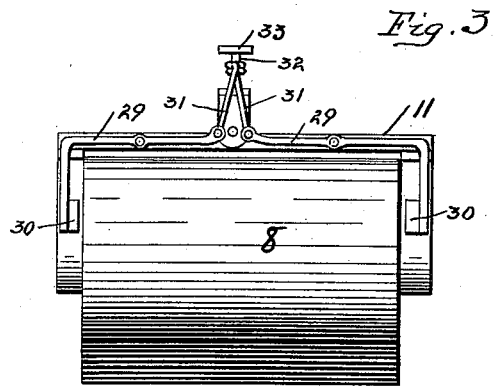
Figure 5:
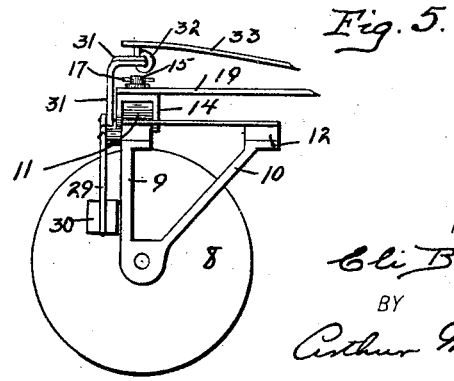

Figure 1 is a perspective view of my device. Fig. 2 is a plan thereof. Fig. 3 is an end elevation of the rear roller, showing the brake mechanism. Fig. 4 is a detail of the means for securing the doubletree to the forward roller-frames. Fig. 5 is a detail of the connection between the brake-links and the operating-lever.

In the drawings, 6, 7, and 8 indicate three rollers made of any suitable material and placed in the usual manner with the roller 8 to the rear of and between the rollers 6 and 7. Pivotally secured upon each end of the shaft of each roller is a pair of arms 9 and 10, each of which is extended beyond the periphery of the roller, and the free ends of these arms are connected with the ends of the similar arms upon the opposite end of the roller-axis by means of longitudinal bars 11 and 12, respectively, thus forming a roller-containing frame. Bar 11 of each roller-frame is preferably placed vertically over the center of the roller, and pivotally secured to the middle of said bar by a substantially horizontal pivot 13, lying at right angles to the axis of the roller, is a yoke 14, provided upon its upper side with a substantially vertical pivot-pin 15. Pivots 15 of the two front rollers 6 and 7 are passed through suitable openings formed near the ends of a transverse connecting-bar 16 and are pivotally held therein by any suitable means, such as a cotter-pin 17. Pivoted to the middle of bar 16, upon a substantially vertical pivot 18, is a rearwardly-extending bar 19, into the rear end of which is pivotally mounted the pivot-pin 15 of the rear roller 8.

All of the usual forms of land-rollers are provided with the usual tongues to which the horses may be hitched in the usual manner. Owing to the peculiar character of work required of these devices, working as they do upon extremely rough ground, the lateral vibration of the tongue is often very great, many times striking the horses a decided blow, resulting in bruised legs and galled necks. In order to overcome this difficulty, I have discarded the old form of tongue and hitch the horses to singletrees 20, carried in a doubletree 21. Secured to each end of the doubletree are two divergent chains 22 and 23, the rear ends of which are secured to the forward bars 12 of the frames of the forward rollers 6 and 7. The doubletree is preferably formed of two parallel strips slightly separated and between which the singletrees are pivoted. In order to allow the singletrees to swing freely, the chains 22 and 23 are secured to eyes 24 and 25, respectively, secured to the top and bottom strips composing the doubletree.

In order to prevent any undue bending stress upon pins 15 of the two front rollers, the bars 12 of the roller-frames thereof are preferably placed vertically nearer the axes of the rollers than the bars 11, so that the line of force exerted upon the chains 22 and 23 will pass between the axis of the roller and the pin 15. Bars 11 and 12 of each roller-frame are connected by suitable braces 26. Secured to bar 16 are two chains 27, which are crossed and the rear ends secured to the bar 12 of the rear-roller frame, the said bar being preferably the same vertical distance from the axis of the rear roller as the bar 11. The resistance of the rear roller with the arrangement described would be exerted upon the bar 16 and there would be a tendency to bend the pins 15 of the front rollers. In order, therefore, to take this stress from said pins, I provide a chain 28, which is secured one end to the middle of bar 16 and the other end to the middle of the doubletree, so that the pull is transmitted directly from the doubletree to the rear-roller frame.

With the construction described it is impossible for the horses to exert any back draft upon the machine. For this purpose I pivot upon the rear side of bar 11 of the rear-roller frame a pair of levers 29, upon the outer end of each of which is mounted a suitable brake-shoe 30. Pivoted to the inner end of each lever 29 is a link 31, the free end of which is pivotally held within an eye 32, carried by one end of an operating-lever 33, preferably pivoted upon the bar 19, the front end of said lever being carried in front of seat 34. In order that the rear roller may be free to swing around its vertical pivot without disturbing the connection between the operating-lever and the connecting-links, the eye 32 should be placed substantially vertically above the vertical pivot of the roller.

It will be noticed that each roller is free to swing upon two axes. Upon one (the horizontal axis 13) the roller is free to swing in a vertical plane in the usual manner, and upon the other (the vertical axis 15) it may be swung in a horizontal plane, thus allowing the whole device to be turned within a short space.

I claim as my invention—

1. In a land-roller, the combination with a roller provided with a suitable containing-frame, of a substantially horizontal pivot for said frame, and a substantially vertical pivot for said frame, whereby the roller may be swung in a vertical plane and in a horizontal plane, the said pivots being substantially vertically above the axis of the roller.

2. In a land-roller, the combination with three rollers one placed between and to the rear of the other two and each provided with a suitable containing-frame, of a substantially horizontal pivot for each of said frames, a substantially vertical pivot for each of said frames, and intermediate connecting-bars connecting the pivots of the three rollers, the said pivots being substantially vertically above the axes of the rollers.

3. In a land-roller, the combination with the three rollers one placed between and to the rear of the other two and each provided with a suitable containing-frame, a substantially horizontal pivot for each of said frames, a substantially vertical pivot for each of said frames, the said pivots being substantially vertically above the axes of the rollers, a single transverse bar connecting the pivots of the two front rollers, and a bar pivoted to said transverse bar and extending to the rear therefrom, the pivots of the rear roller being supported by the said second bar, substantially as and for the purpose set forth.

4. In a land-roller, the combination with three rollers one placed between and to the rear of the other two and each provided with a suitable frame, a substantially horizontal pivot for each of said frames, a substantially vertical pivot for each of said frames, the said pivots being substantially vertically above the axes of the rollers, a single transverse bar connecting the pivots of the two front rollers, a bar pivoted to said transverse bar and extending to the rear therefrom, the pivot of the rear roller being supported by said second bar, and flexible connections secured to the frames of the front rollers to which the horses may be hitched.

5. In a land-roller, the combination with a pair of rollers, of a transverse bar pivotally connected with said rollers, a bar connected to said transverse bar and extending to the rear, a third roller pivotally connected to said bar, a hitching-bar, a pair of flexible connections between said hitching-bar and each of the front rollers, and a flexible connection between the hitching-bar and the transverse bar, substantially as and for the purpose set forth.

6. In a land-roller, the combination with a pair of rollers, provided with suitable frames, a horizontal pivot for each of said frames, a vertical pivot for each of said frames, the said pivots being substantially vertically above the axes of the rollers, a transverse bar to which the horses may be hitched, and flexible connections between the said bar and the rollers, substantially as and for the purpose set forth.

7. In a land-roller, the combination with a roller provided with a containing-frame pivoted so as to swing about a vertical axis and about a horizontal axis, of a brake-beam mounted upon said frame and provided with means to engage the roller, an operating-lever, an eye carried by said lever substantially in line with the vertical pivot of the roller, and a link pivoted to the brake-lever and the eye, the arrangement being such that the roller may swing freely around its vertical pivot without disturbing the brake connections, substantially as described.

8. In a land-roller, a roller therefor having a frame supported upon its axis, the said frame consisting of arms supported upon each end of the axis, and a pair of transverse members connecting said arms across the face of the roller, one of said transverse members located substantially vertically over the axis of the roller, and the other of said members being placed in front of and below the first member, means connected with the first member for holding the frame in position, the arrangement being such that the propelling means may be secured to the second member, substantially as described.

9. In a land-roller, the combination with a roller provided with a suitable containing-frame pivotally mounted upon the axis thereof, of a yoke pivotally mounted upon said frame, above the axis thereof, upon a substantially horizontal axis, means for supporting said yoke, and a substantially vertical pivotal connection, substantially vertically above the axis of the roller, between the yoke and the supporting means, whereby the roller may be swung in a vertical plane and in a horizontal plane, substantially as described.

ELI B. REECE.

Witnesses:
 ELMER J. BINFORD,
 MARK A. CATT.